May 22, 1934.  A. W. BRUCE  1,960,048
MACHINE AND METHOD FOR AUTOMATICALLY TREATING POULTRY
Filed Oct. 4, 1933  2 Sheets-Sheet 1

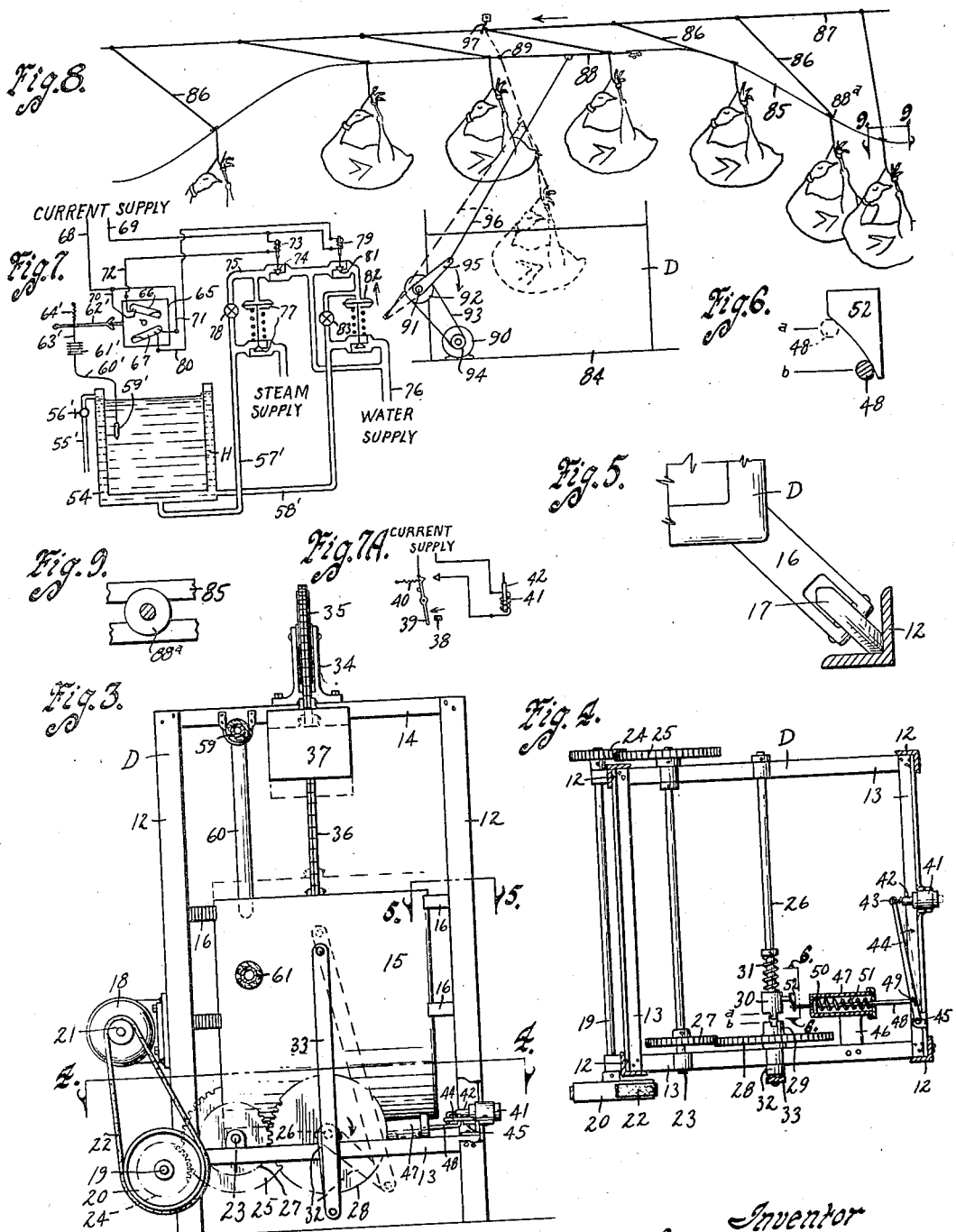
May 22, 1934.  A. W. BRUCE  1,960,048
MACHINE AND METHOD FOR AUTOMATICALLY TREATING POULTRY
Filed Oct. 4, 1933  2 Sheets-Sheet 2

Patented May 22, 1934

1,960,048

UNITED STATES PATENT OFFICE 1,960,048

MACHINE AND METHOD FOR AUTOMATICALLY TREATING POULTRY

Albert W. Bruce, Ottumwa, Iowa

Application October 4, 1933, Serial No. 692,117

5 Claims. (Cl. 17—45)

My present invention relates to a machine for automatically treating poultry.

More particularly, it is my purpose to provide a machine for coating partially plucked poultry with wax or adhesive material, which may subsequently be removed for carrying with it feathers, down, hair and extraneous material from the poultry.

It is my purpose in this connection to provide a machine, preferably including a conveyor on which the poultry may be supported and to provide means whereby at a certain point in the path of travel of the individual fowl, it may be coated with the wax or adhesive material. Owing to the difficulty in securing a sufficient coating in one operation, I preferably apply the wax at least twice.

It is my purpose to provide in such a machine a number of novel features of construction and certain controls, which will hereinafter be more fully described.

Another object of my invention is to provide a method for treating fowls with paraffin and removing the paraffin.

With these and other objects in view, my invention consists in the construction, arrangement and combination of the various parts of my machine and in a method for automatically treating poultry, whereby the objects contemplated are attained, as hereinafter more fully set forth, pointed out in my claims, and illustrated in the accompanying drawings, in which:

Figure 3 is a side elevation of the waxing tank, parts being shown in section.

Figure 4 is a horizontal, sectional view taken on the line 4—4 of Figure 3, parts being shown in section and the tank proper being omitted for the better showing of the other parts.

Figure 5 is a detailed, sectional view taken on the line 5—5 of Figure 3.

Figure 6 is a detailed, sectional view taken on the line 6—6 of Figure 4, illustrating the clutch cam.

Figure 7 is a diagrammatic view illustrating the controls for the tempering tank.

Figure 7A is a diagram illustrating the circuit for the clutch controlling solenoid.

Figure 8 is a diagrammatic view of a modified form of my invention; and

Figure 9 is a detailed, sectional view taken on the line 9—9 of Figure 8.

Figure 1:
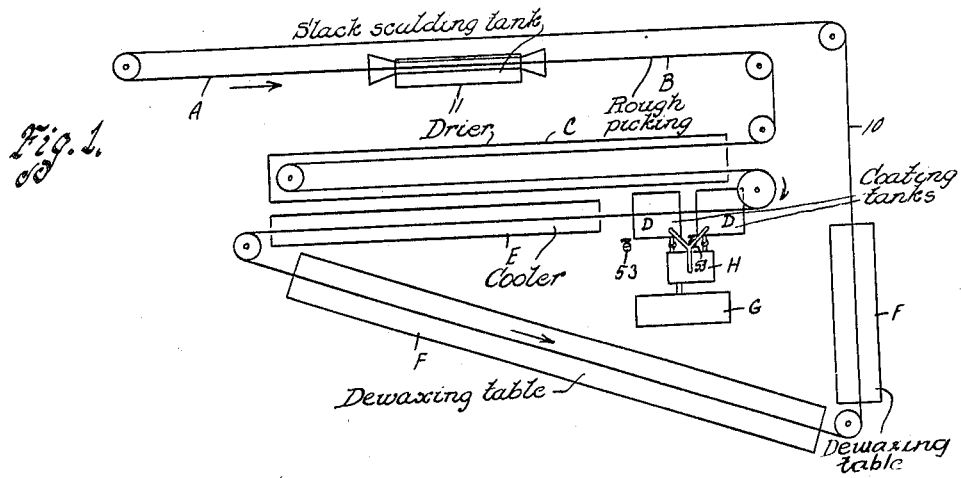
Figure 1 is a diagrammatic view illustrating an installation including my machine.

By referring to Figure 1, the general arrangement of my machine and its relation to the general environment in which it is installed, may be briefly described.

I have used the reference numeral 10 to indicate an endless conveyor in the form of a chain or otherwise on which the fowls are carried from the point where they are hung to the various operative mechanisms. The fowls are preferably hung on the endless conveyor by means of shackles, which in themselves form no part of my present invention. They are supported by their feet and are killed at about the point indicated at A in Figure 1.

They then pass to a slack scalding machine 11, where they are semi-scalded. From the machine 11, they pass to the point B, and at about that point, they are rough-picked. They then pass into a cooling chamber C where they are cooled and dried. It is important that the fowls should be dried and cooled to some extent before they are subjected to the melted wax.

I might say that the wax is a composition and its particular ingredients are not here important, but for convenience in description, I shall call the composition "wax".

From the drier, the fowls pass to the machine or machines D for giving them the wax coating, and then they are immediately passed through another cooler E from which they go to the picking tables F, where the wax coating together with hair, down, feathers and so on are removed.

At G, I have shown the reclaiming tank in which the wax is separated from the dirt and feathers and so on.

From the tank G, the reclaimed wax is conveyed to the tempering tank H, where the wax is heated and maintained at a fixed predetermined temperature.

I shall now describe in greater detail the waxing tank D and shall then refer further to the tempering tank.

Waxing tank structure

Figure 2:
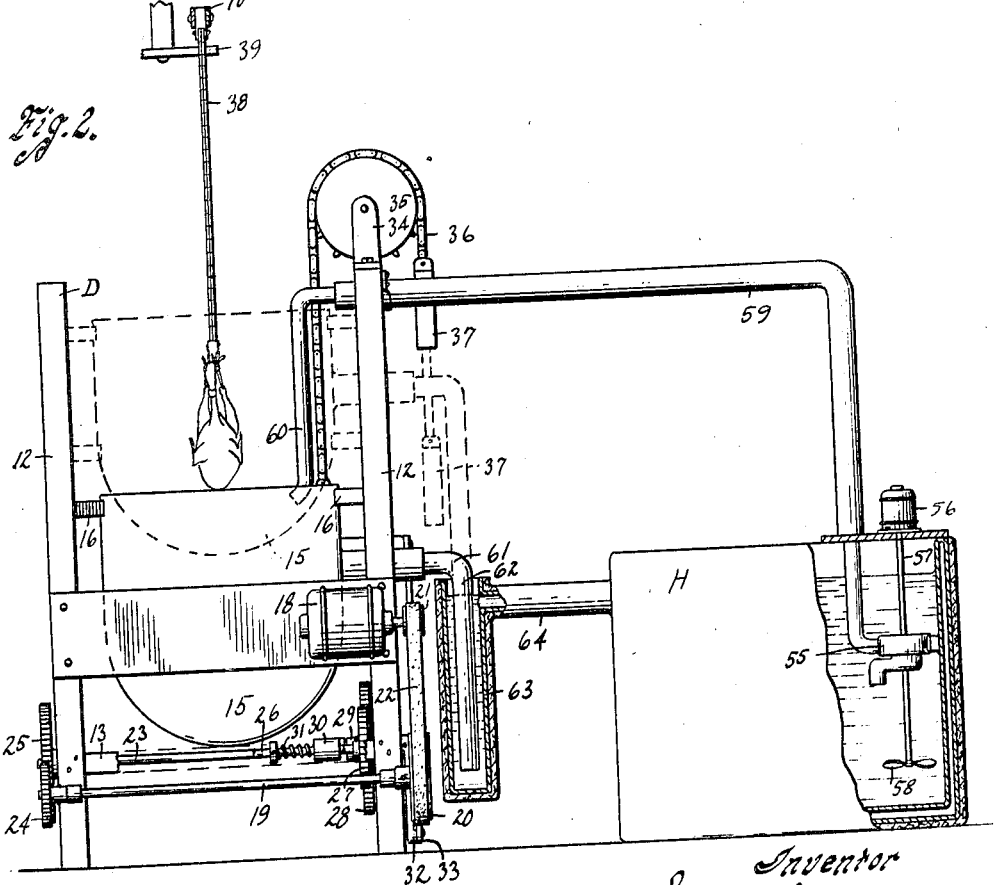
Figure 2 is a front elevation of one of the waxing tanks and a tempering tank, parts being broken away and parts being shown in section.

In Figures 2 and 3, I have shown a preferred form in which my waxing tank may be embodied. This tank structure includes a frame, comprising four corner posts 12, preferably having the form of angle bars. Near the lower ends of the posts, they are connected by suitable cross brace members 13. At the top of the frame, the respective pairs of side posts are connected by the side frame members 14.

Slidably mounted to travel up and down on the frame members 12 is the wax containing tank 15. This may be mounted in any suitable way for sliding. As shown, I have illustrated the tank 15 provided with the arms 16 projecting from the corners and having the rollers 17 to slide in the corner posts 12. (See Figures 3 and 5.)

In the form of the invention illustrated in Figures 2 and 3, the fowls travel along the endless conveyor at a certain height, and the tank is lifted at the proper intervals when a fowl is above it to cause the fowl to be dipped in the wax.

The fowls are hung by the legs as they travel through the slack scalder 11 and the cooler C, but their heads are trussed up so that they are hung by both their heads and feet during the waxing operation. This is in order to avoid getting wax on the heads and feet.

The tank 15 is raised from the position shown in full lines in Figure 2 to the position shown in dotted lines in that figure for effecting the waxing operation.

I shall now describe the mechanism for raising the tank.

Supported on the forward side of each waxing tank D is a motor 18. Below the motor 18, there is mounted a suitable transverse shaft 19. On one end of the shaft 19 is a pulley 20, which is aligned with the pulley 21 on the motor shaft and operated therefrom by means of a belt 22. Parallel with the shaft 19 and somewhat rearwardly thereof, a shaft 23 is journaled on the frame members 13 (Figure 4). On the opposite end of the shaft 19 from the belt pulley 20 is a pinion 24 in mesh with a gear 25 on the shaft 23. Arranged rearwardly with relation to the shaft 23 is a parallel shaft 26 suitably journaled on the frame members 13.

On the end of the shaft 23 opposite the gear 25 is fixed a pinion 27, which meshes with a gear 28 rotatably but non-slidably mounted on the shaft 26. Formed on the gear 28 is a clutch member 29. A clutch member 30 is slidably but non-rotatably mounted on the shaft 26 and is tensioned toward the clutch member 29 by means of a spring 31.

On the shaft 26 outside the frame of the waxing tank is fixed an arm 32, shown in full lines in one position in Figure 3 and in dotted lines in another position.

Pivoted to the outer end of the arm 32 is a link 33 which extends upwardly and is pivoted to the tank proper 15.

It will be seen that when the gear 28 is rotated, the arm 32 and link 33 will cause the tank 15 to be alternately lifted and lowered.

On a frame member 14 is mounted the bracket 34, which carries the sprocket wheel or the like 35. A chain 36 is secured to the side of the tank 15 and is trained over the sprocket 35 and supports the counterweight 37 for counter-balancing the tank 15.

It will be obvious that the structure here shown is illustrative only and that counterweights or counter-balancing springs could be used on both sides of the tank and that mechanism such for instance as that comprised in the gear 28, the arm 32, and link 33 could be duplicated on opposite sides of the tank if that were desirable.

It will be observed that when the device is in operation, the motor will be running and will impart continuous rotation to the gear 28.

For controlling the clutch member 30, so that it will be moved into cooperative relation with the clutch member 29 at the proper time in the passage of the fowl, I have provided the following means:

Suitably supported in the path of the chains 38 from which the fowls are supported by means of the shackles mentioned at proper points are the pivoted switch arms 39. It is, of course, obvious that these switch arms may be located where desired and that the waxing tanks are readily portable.

When a particular chain reaches position where the fowl hangs above the waxing tank D, the chain 38 swings the switch arm 39 (see Figures 2 and 7A) to switch closing position.

It may perhaps be here mentioned that as the chain continues to travel, it soon slides past the switch arm 39, which is thereupon pulled to circuit breaking position by means of the spring 40. When the switch arm is actuated for closing the circuit in the manner just indicated, the circuit is closed through a solenoid 41. (Figures 4 and 7A.) The core 42 of the solenoid has a pivotal connection at 43 with one end of the lever 44, the other end of which is pivoted at 45.

Supported on a bracket 46 is a tubular casing 47 through which slides the rod 48, which has a loose pivotal connection to the lever 44 at 49. Fixed to the rod 48 within the casing 47 is a washer or the like 50. A spring 51 bears against the washer 50 and against the opposite end of the casing 47 with the effect of normally tending to pull the solenoid core 42 outwardly.

When the solenoid is energized and the core is pulled in, the lever 44 is actuated to compress the spring 51 and pull the rod 48 from its position shown in Figure 4 toward the right.

The clutch member 30 carries a projecting cam plate 52. When the shaft 26 is rotated, thereby rotating the clutch member 30 and the rod 48 is in its left-hand position, the cam plate 52 engages the projecting left end of the rod 48, and in the further rotation of the clutch member, the rod 48 travels along the face of the cam 52 and thus shoves the clutch member from the position $a$ of Figure 4 to position $b$ thereof, against the tension of the spring 31 for declutching the mechanism. The parts then remain in such position until the appropriate chain or the like actuates the switch arm 39 for closing the circuit through the solenoid 41. Thereupon the core 42 is pulled inwardly for pulling the arm 48 (Figure 4) to the right and withdrawing the left-hand end of the said arm from engagement with the cam plate 52.

The spring 31 then forces the clutch member 30 into engagement with the clutch member 29 and the rotation of the gear 28 acting through the clutch members imparts one full rotation to the shaft 26. The rotation of that shaft through the media of the arm 32 and link 33 raises the tank 15 from full line position shown in Figures 2 and 3 to dotted line position shown in Figure 2, for immersing a fowl in the wax bath, and then lowers the tank. In the meanwhile the chain will have cleared the switch arm 39 and the spring 40 will have broken the circuit (Figure 7A) and the spring 51 will have actuated the rod 48 for projecting the end of the rod 48 into the path of the cam 52 and for simultaneously withdrawing the core 42.

After one cycle or rotation of the shaft 26, the cam plate 52 will engage the rod 48 and be moved to declutching position. The fowl moves on to the next waxing tank and is again treated to a waxing operation. It is difficult to get enough wax on the fowl at one dipping. I may provide fans 53 for blowing cold air on the fowls for giving the initial set to the wax coating as quickly as possible after the fowls leave the wax bath.

It will, of course, be understood that as many of the waxing tanks may be employed as is necessary for imparting to the fowls a wax coating having the desired thickness.

It will be understood that there is a constant flow of wax from the tempering tank to each waxing tank and back to the tempering tank.

The wax tank is heat insulated in any suitable way.

A controlled flow of wax from the re-claiming tank to the tempering tank may be provided for in any suitable way.

I shall now describe the temperature controls for the tempering tank and the flow arrangement between the tempering tank and the wax tanks.

*Tempering tank*

In Figure 7, I have illustrated a tempering tank H having a steam and water jacket 54. The outer wall is also heat insulated in any way.

In the tempering tank is a pump 55 operated from a motor 56 by means of a shaft 57, which extends through the pump and has on its lower end in the lower part of the tempering tank an agitator 58.

The wax is pumped from the tank H through the heat insulated pipe 59 to the down-turned pipe 60 extending into the top of the tank 15. The pipe 60 is so arranged that it discharges into the upper part of the tank 15 when the latter is in lowered position and is substantially received within the tank 15 when the latter is raised.

Leading from the upper part of the tank 15 is the discharge pipe 61, having a downward extension 62 telescopically received in the upright heat insulated pipe 63.

A heat insulated pipe 64 leads from the upper part of the pipe 63 into the upper part of the tempering tank H.

During the operation of the machine, the constant flow of wax between the tempering tank and the waxing tank may be maintained.

It will be observed also that the arrangement is such as to maintain the wax in the waxing tank at the level of the outlet pipe 61 regardless of the amount of wax used by the fowls.

The temperature of the wax in the tempering tank is maintained within predetermined limits, and I thereby maintain the liquidity of the wax in the tank 15.

I provide the following mechanism for controlling the temperature of the tempering tank H.

The steam and water jacket of the tempering tank has a bleeder tube 55', which may have an automatic control valve 56'. Connected with the water jacket is a steam supply pipe 57' and a water supply pipe 58'.

In the tank H is a temperature sensitive bulb 59'.

The parts are so arranged that when the temperature of the wax in the tank goes below a predetermined degree, steam is supplied to the water and steam jacket and when the temperature goes above a certain degree, water is supplied to the jacket. The bulb 59' is connected by means of a tube 60' with an ordinary expansion bellows 61'. Above the bellows is pivoted a switch control lever 62' with which the bellows 61' is operatively connected by means of a rod 63'. A spring 64' helps to normally hold the switch lever 62' in normal control position.

A switch supporting block 65 is centrally pivoted and has supported on it the switches 66 and 67 of the ordinary mercury type.

The lever 62 is operatively connected with the block 65, so as to rock it when the lever is moved upwardly or downwardly from its neutral position. For example, if the temperature of the wax goes below the predetermined point, the bellows will contract and thus swing the lever 62' downwardly for rocking the block 65 and causing the switch 66 to close a circuit.

The current supply wires are indicated at 68 and 69. One of them is connected by a wire 70 with the switch 66 and by a wire 71 with the switch 67. From the other contact of the switch 66 extends a wire 72 to a solenoid 73. The wire 69 also extends to the solenoid 73. The core of the solenoid 73 controls a valve 74 in the branch 75 connected with the water pressure pipe 76. The valve 74 is normally seated, but when the solenoid 73 is energized, the valve 74 is opened for permitting water to flow into the ordinary pressure valve 77. The pressure valve 77 is normally closed but when the water is supplied to it under pressure, it is opened. The valve 77 controls flow through the steam supply pipe 57'. The valve 77 is of the ordinary well-known construction.

As soon as the temperature of the wax reaches the desired point, the bellows 61 will expand and restore the lever 62 to normal position, thus rocking the block 65 and switch 66 for breaking the circuit through the solenoid 73. The valve 74 then closes and no additional pressure is supplied to the valve 77.

At 78 is a leakage valve, which when the valve 74 is closed, permits the water to flow from the valve 77 into the steam pipe 57' and thus reduces the pressure on the valve 77, whereupon the valve 77 closes.

Sometimes the temperature of the wax in the tank H gets too high, because of the heat of the wax flowing in from the reclaiming tank. The wax in the reclaiming tank must be at a considerably higher heat than that desired for the wax in the tempering tank. If the wax in the tempering tank H gets too hot, the bellows 61 expands, thus rocking the block 65 and the switch 67 to the point where the latter closes a circuit through a solenoid 79.

I have explained that the one current supply wire is connected with the switch 67. The other contact of that switch is connected by a wire 80 with the solenoid 79. The arrangement of the solenoid 79 is similar to that of the solenoid 73. The solenoid 79 operates a valve 81 in the water pressure pipe for admitting water under pressure to a pressure valve 82 similar to the valve 77 controlling the flow through the water pipe 58'.

The leakage valve 83 functions in a way similar to that of the leakage valve 78.

With the wax which I now use, the temperature of the wax in the tempering tank is maintained at close to 118° F.

The constant flow of wax between the tempering tank and the waxing tank keeps the temperature in the waxing tank uniform.

*Modified form*

In Figures 8 and 9, I have shown a slightly modified form of my device.

In the modified form, I employ a waxing tank 84 with insulated walls. I provide also a section of guiding track indicated at 85. This is a slotted track as indicated in Figure 9.

The fowls are supported on chains 86 from the conveyor 87. The chains are provided with disc-like buttons 88a.

As the fowls approach the tank 84, the track section 85 rises as indicated and the fowls are drawn along until they reach a portion of the track 85, indicated at 88, which is hinged at 89 for permitting the hinged track portion 88 to drop.

For permitting the fowls to be dropped into the wax in the tank 84, I provide the following means:

Supported in operative relation to the tank 84 is a motor 90. Spaced from the motor 90 is a shaft 91 on which is rotatably but non-slidably mounted the pulley 92, which is operated by means of a belt 93 from the motor pulley 94. On the pulley 93 is an arm 95, which is connected by a rod 96 with the hinged track portion 88.

Suitably supported in the path of the moving chains 86 is a switch 97 which is preferably similar in structure and functioning to the switch 39. The switch 97 closes a circuit similar to that heretofore described and shown in Figure 7A for cooperating with clutch mechanism on the shaft 91 similar to that already described for the shaft 26.

When the shaft 97 is operated for closing the circuit, one rotation is imparted to the shaft 91, whereby the section 88 is lowered to its dotted line position shown in Figure 8 for immersing the fowl, except its feet and head, in the wax in the tank 84.

While I have shown only one tank 84, I preferably use two for the reasons already explained.

It will be seen from the description of the modified form shown in Figure 8 that the waxing operation can be accomplished by lowering the fowl into the wax as well as by raising the wax upwardly for immersing the fowl.

It will be seen from the foregoing that I have provided means for coating the fowls after they have been rough-picked with a wax-like substance, which is immediately cooled and may then be pulled off, carrying with it the hair, pin feathers and so forth.

It will also be seen from the foregoing that the mechanism for accomplishing this purpose can be modified in many respects, and it is my purpose to cover by my claims any such modifications or use of mechanical equivalents, which may be included within the scope of my claims and of my invention.

It will be observed that I have in the foregoing description explained a novel method for treating fowls. In the practice of this method, the fowls are rough-picked. This is usually done with the fowls hanging by their feet. The heads of the fowls are then hung up so that the fowls hang by their feet and their heads. Thereupon the fowls, except their heads and feet, are subjected to a coating of wax. The reasons for not subjecting the heads and feet are largely explained in the foregoing description.

After the coating of wax has been applied, the coated fowls are immediately subjected to a cooling step, by which the wax is hardened and set. After the cooling, the fowls come to the place where the wax is removed.

I have found that when the fowls are hung by both their heads and their feet during the application of the coating and are cooled while still so supported then when they are straightened out the coating breaks and can easily be pulled off.

I claim as my invention:

1. A method of treating fowls, comprising placing the fowls in a suspended position with their heads and feet above their bodies, mechanically advancing the fowls, while maintaining them in such suspended position, to a coating zone, imparting to the bodies only, a coating of melted adhesive wax-like material during the period that the fowls are maintained in the coating zone, mechanically advancing the fowls, while maintained with their heads and feet above their bodies, from the coating zone to a cooling zone, subjecting the fowls to cooling action during the period that the fowls are maintained in the cooling zone, releasing the fowls partially to permit the placing of the head, body and feet of each fowl in substantial alignment, substantially aligning the head, body and feet of each fowl and simultaneously breaking the coating, and then removing the coating.

2. A method of treating fowls, comprising placing the fowls in a suspended position with their heads and feet above their bodies, mechanically advancing the fowls, while maintaining them in such suspended position, to a coating zone, imparting to the bodies only, a coating of melted adhesive wax-like material during the period that the fowls are maintained in the coating zone, mechanically advancing the fowls, while maintained with their heads and feet above their bodies, from the coating zone to a cooling zone, and subjecting the fowls to cooling action during the period that the fowls are maintained in the cooling zone.

3. A method of treating fowls, comprising placing the fowls, in a suspended position with their heads and feet above their bodies, advancing the fowls, while maintaining them in such suspended position, to a coating zone, and there mechanically coating the bodies only while they are maintained in said zone for imparting to such bodies only a coating of melted, adhesive, wax-like material, advancing the fowls, while maintained with their heads and feet above their bodies, from the coating zone to a cooling zone, subjecting the fowls to cooling action during the period that the fowls are maintained in the cooling zone, releasing the fowls partially to permit the placing of the head, body and feet of each fowl in substantial alignment, substantially aligning the head, body and feet of each fowl and simultaneously breaking the coating, and then removing the coating.

4. A method of treating fowls, comprising placing the fowls in suspended position with their heads and feet above their bodies, mechanically conveying the suspended fowls continuously in an advanced direction to be treated, treating the same by coating the body portions only, of the fowls, while in suspended position, and while thus conveyed, with melted, adhesive, wax-like material, and then cooling the fowls while in such suspended position and coated condition and while thus conveyed.

5. A method of treating fowls, comprising placing the fowls in suspended position with their heads and feet above their bodies, mechanically conveying the suspended fowls continuously in an advanced direction to be treated, treating the same by coating the body portions only, of the fowls, while in suspended position, and while thus conveyed, with melted, adhesive, wax-like material, and then cooling the fowls while in such suspended position and coated condition and while thus conveyed, and then removing the wax from the bodies of the fowls.

ALBERT W. BRUCE.